H. W. PATTERSON.
SPEED COASTER.
APPLICATION FILED JAN. 12, 1916.

1,199,711. Patented Sept. 26, 1916.

Inventor
Herman W. Patterson
By Edward A. Straus Atty.

UNITED STATES PATENT OFFICE.

HERMAN W. PATTERSON, OF LOS ANGELES, CALIFORNIA, ASSIGNOR TO GEORGE K. PATTERSON, OF LOS ANGELES, CALIFORNIA.

SPEED-COASTER.

1,199,711.   Specification of Letters Patent.   Patented Sept. 26, 1916.

Application filed January 12, 1916. Serial No. 71,669.

*To all whom it may concern:*

Be it known that I, HERMAN W. PATTERSON, a citizen of the United States, residing at Los Angeles, in the county of Los Angeles and State of California, have invented new and useful Improvements in Speed-Coasters, of which the following is a specification.

This invention relates to speed coasters, and pertains especially to a gravity propelled vehicle which may be used in coasting down hills.

Figure 1:
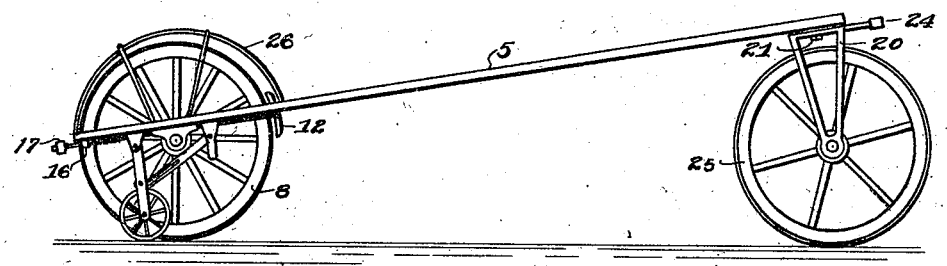
Figure 2:
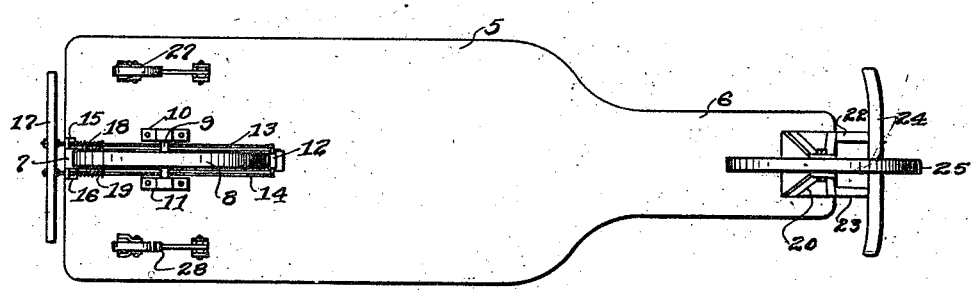
Figure 3:
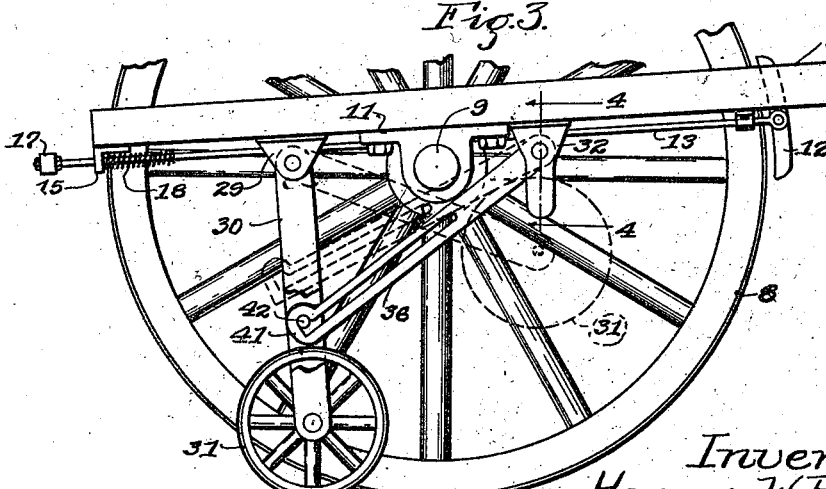
Figure 4:
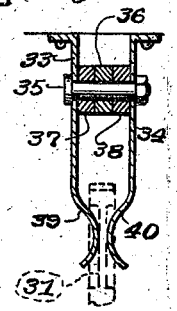

It is an object of this invention, first, to provide a vehicle having two transporting wheels and which is adapted for coasting down inclines in which the operator may ride thereon in a recumbent position and control the speed by means of his feet while steering with his hands; second, to provide the vehicle with balancing wheels which may be disposed in inoperative position while coasting, and in operative position when the vehicle is trailed so that it will not over-balance. I accomplish these objects by means of the embodiment of my invention illustrated in the accompanying drawing, in which:

Figure 1 is a side elevation of my improved coaster. Fig. 2 is a bottom view. Fig. 3 is an enlarged fragmentary side elevation showing the rear wheels and brake. Fig. 4 is a section as seen on the line 4—4 of Fig. 3.

More specifically, the bed of the coaster is comprised of a plate, preferably a board of elongated form, as indicated at 5, and reduced in width at the forward end as indicated at 6. It is of a length to accommodate the body of a person lying face downward; this being the position in which the coaster is intended to be used by the operator. At the rear is a slot 7 in which is disposed the rear transporting wheel 8 which extends therethrough, the axle 9 thereof being journaled in bearing brackets 10 and 11.

A brake shoe is indicated at 12 and has secured to its edges rods 13 and 14 which extend below the bed 5 to the rear thereof and through brackets 15 and 16. The ends of rods 13 and 14 are secured to a pedal 17 which is arranged transverse to the bed and extends on opposite sides of the wheel 8, so that the operator of the coaster when lying thereon may place his feet against the pedal 17 in such a position that the brake may be operated. In order to maintain the brake shoe 12 out of engagement with wheel 8, springs 18 and 19 are secured to the rods 13 and 14 respectively, and abut the brackets 15 and 16 normally holding the shoe out of engagement with the wheel.

At the forward end of the bed 5 is a downwardly extending steering fork 20 which is secured to the bed 5 by a king bolt 21. Arms 22 and 23 are secured to the fork 20 and extend forward to a handle 24 which is in a position convenient to be grasped by the operator for steering the coaster. The steering wheel 25 is of substantially the same size as the rear wheel 8, and is secured to the bracket 20 so that the bed 5 is inclined to the ground line of the wheels. By means of this construction the bed 5 is given an inclination so that when coasting upon an incline it is substantially level. A guard for the wheel 8 is indicated at 26 and is secured to the bed 5 by suitable brackets. This guard protects the wheel and prevents the clothing from engaging therewith.

The coaster, as described, is of the bicycle type, and means must be provided for balancing the same when the coaster is trailed as it must be after coasting to the bottom of a hill. The coaster will operate most successfully when there are only two wheels so that the balancing means should be adjustable for throwing into operative position when the vehicle is trailed, and into inoperative position when it is used for coasting.

My balancing structure comprises balancing wheel mechanism 27 disposed on one side of the rear wheel 8 and a similar mechanism 28 disposed on the opposite side. As the mechanisms 27 and 28 are duplicates, only one will be described.

A bracket 29 is secured to the body 5 and pivotally secured thereto is a bar 30 which carries at its lower end a wheel 31. The length of the bar 30 and the diameter of the wheel 31 are such that when disposed in position shown in Fig. 3, the wheel 8 and wheel 31 will rest upon the ground. A bracket 32 is secured to the body 5, and comprises two members 33 and 34 which are adapted to be secured by screws or any other suitable means to the body 5. A bearing pin 35 extends between the members 33 and 34 and pivotally mounted upon it is the link 36. Spacing blocks 37 and 38 are also mounted upon a pivot pin 35. Members 33 and 34 are extended to form spring tongues as indicated at 39 and 40. Link 36 is provided with a slot extending part of the length of the link and off-set as indicated at 41. A pin 42 which is secured to the bar 30 is disposed in the slot.

When the wheel 31 is in the position shown in full lines in Fig. 3 the pin 42 rests in the off-set portion 41 of the slot, and bar 30 is held against moving either forwardly or rearwardly. In such position the coaster can be trailed. When it is desired to coast, the bar 36 is lifted to move the pin 42 out of the off-set portion 41 of the slot and the wheel 21 is pulled forward to the position shown in dotted lines, pin 42 riding along the slot. The wheel 31 is forced with its rim upwardly between the tongues 39 and 40 of the bracket 32 in which position it will be held out of operative position. When it is desired to trail the coaster, the wheel 31 is given a pull releasing it from the tongues 39 and 40. As it reaches the position shown in full lines in Fig. 3, the link 36 drops downwardly, pin 42 engaging the off-set portion 41 of the slot. The trailing wheels are now in position to keep the coaster from overbalancing.

It is obvious that with my coaster having but two transporting wheels shorter turns may be made; there is less road resistance and friction, and a resultant increase in speed.

None of the advantages of a three or four wheeled coaster is lost as my coaster can be trailed. There is also an advantage in the position of the brake operating means as the brake can be operated without removing the hands from the steering gear; a greater braking effect can be obtained by use of the feet. All of these factors contribute in making a speedy, easily controlled and safe coaster.

What I claim is:

1. A coaster, comprising in combination, a front steering wheel, a rear transporting wheel, a body upon which the operator is adapted to lie, a brake for said rear wheel, and operating means for said brake including a pedal arranged to be engaged by the feet of said operator.

2. A coaster, comprising in combination a front steering wheel, a rear transporting wheel, a body inclined to the ground line of said wheels upon which the operator is adapted to lie, a brake for said rear wheel, and operating means for said brake including a pedal arranged in the rear of said rear wheel and transverse to said body.

3. A coaster, comprising in combination a front steering wheel, a rear transporting wheel, a body upon which the operator is adapted to lie, balancing wheels upon each side of the line joining said front and rear wheels, means securing said balancing wheels to said body and arranged for moving said wheels into and out of operative position.

4. A coaster, comprising in combination a front steering wheel, a rear transporting wheel, a body upon which the operator is adapted to lie, a brake for said rear wheel, operating means for said brake including a pedal arranged to be engaged by the feet of said operator, balancing wheels on each side of the line joining the front and rear wheels, means securing said balancing wheels to said body and arranged for moving said wheels into and out of operative position.

5. A coaster, comprising in combination a front steering wheel, a rear transporting wheel, a body inclined to the ground line of said wheels upon which the operator is adapted to lie, a brake for said rear wheels, operating means for said brake including a pedal arranged in the rear of said rear wheels, and transverse to said body, balancing wheels on each side of the line joining said front and rear wheels, means securing said balancing wheels to said body, and arranged for moving said wheels into and out of operative position.

In witness that I claim the foregoing I have hereunto subscribed my name this 17th day of December, 1915.

H. W. PATTERSON.